May 5, 1964  J. P. CREIGHTON ETAL  3,131,539
HYDRAULIC TRANSMISSION
Filed Nov. 20, 1961  2 Sheets-Sheet 1

JOHN P. CREIGHTON
ERIC J. BANKS
INVENTORS

ATTORNEYS

JOHN P. CREIGHTON
ERIC J. BANKS
INVENTORS

United States Patent Office 3,131,539
Patented May 5, 1964

3,131,539
HYDRAULIC TRANSMISSION
John P. Creighton, Solihull, and Eric J. Banks, Halesowen, England, assignors to Ford Motor Company, Dearborn, Mich., a corporation of Delaware
Filed Nov. 20, 1961, Ser. No. 153,560
6 Claims. (Cl. 60—53)

Our invention relates generally to power transmission mechanisms, and more particularly to an improved hydrostatic power transmission mechanism having infinitely variable speed ratio characteristics.

The improved mechanism of our invention is capable of transferring torque through a split torque delivery path from a driving member to a driven member, a portion of the torque being transferred mechanically through torque transmitting members and the remaining portion of the torque being transmitted hydraulically, a pair of hydrostatic units being provided for this purpose. The proportion of the torque transferred hydraulically relative to the portion delivered mechanically can be varied by adjusting the relative displacements of the units. It thus is possible to condition the transmission mechanism for operation with any desired speed ratio. The proportion of the torque transferred hydraulically decreases from a maximum value in the lowest over-all speed ratio to a value of zero during direct drive operation.

It is possible also to establish an overdrive condition by adjusting the relative displacement of the units beyond an overcenter position that gives rise to a direct drive relationship.

The hydrostatic units of the instant embodiment of our invention are each in the form of a hydraulic pump or motor situated in a common, closed hydrostatic circuit. Each unit comprises a rotor defining in part a piston and cylinder assembly and a cooperating swash plate that is fixed relative to the rotor of the hydrostatic unit.

At least one of the swash plates is of infinitely variable inclination. Each rotor is suitably ported and cooperates with a separate face valve that is in phase with its respective swash plate. The swash plates actuate the piston and cylinder assembly to provide a pumping action, and the resulting fluid flow is distributed through the face valve for one unit into the cooperating face valve for the other unit. The two face valves are disposed in abutting face-to-face relationship, the abutting faces being provided with registering annular grooves that communicate with the phased fluid pressure ports in the rotor.

One of the face valves in anchored to the transmission housing and the other rotates with the driven member. A slight overbalance in the hydrostatic forces acting in an axial direction is provided in order to maintain the face valves in cooperating face-to-face relationship.

Each of the face valves is ported suitably to provide distribution from one hydrostatic unit to the other during operation, thereby establishing a hydrostatic torque delivery path, one unit acting as a pump and the other as a motor.

In the instant embodiment, each of the rotors is connected drivably to the power input shaft so that it rotates at the speed of the prime mover. The swash plate and the piston and cylinder assembly for the hydrostatic unit that cooperate with the rotary face valve form a driving connection between the driving member and the driven member. This swash plate is capable of either overrunning the driving member or operating at a relatively reduced speed depending upon the relative displacements of the hydrostatic units.

The provision of a transmission mechanism having the features above described is a principal object of my invention.

It is another object of my invention to provide a transmission mechanism of the type above set forth wherein provision is made for compensating for wear between the relatively movable face valves.

An annular piston and cylinder mechanism, including a portion defined by the stationary housing and a cooperating portion carried by a rotary housing portion for the rotary face valve, is provided to maintain the face valves in cooperating relationship. Such an arrangement automatically compensates for wear between the rotary surfaces of the valves.

It is also an object of my invention to provide a universal adjustment in the positive driving connection between the power input shaft and the two rotors. This is accomplished in the instant embodiment by means of crowned splines that allow a slight articulation of the rotors with respect to the power input shaft. This allows for manufacturing tolerances and insures an adequate oil film surface between the relatively movable surfaces of the valve structure. This contributes in turn to the over-all operating efficiency.

Further objects and features of my invention will become apparent from the following description and from the accompanying drawings, wherein.

Figure 1:
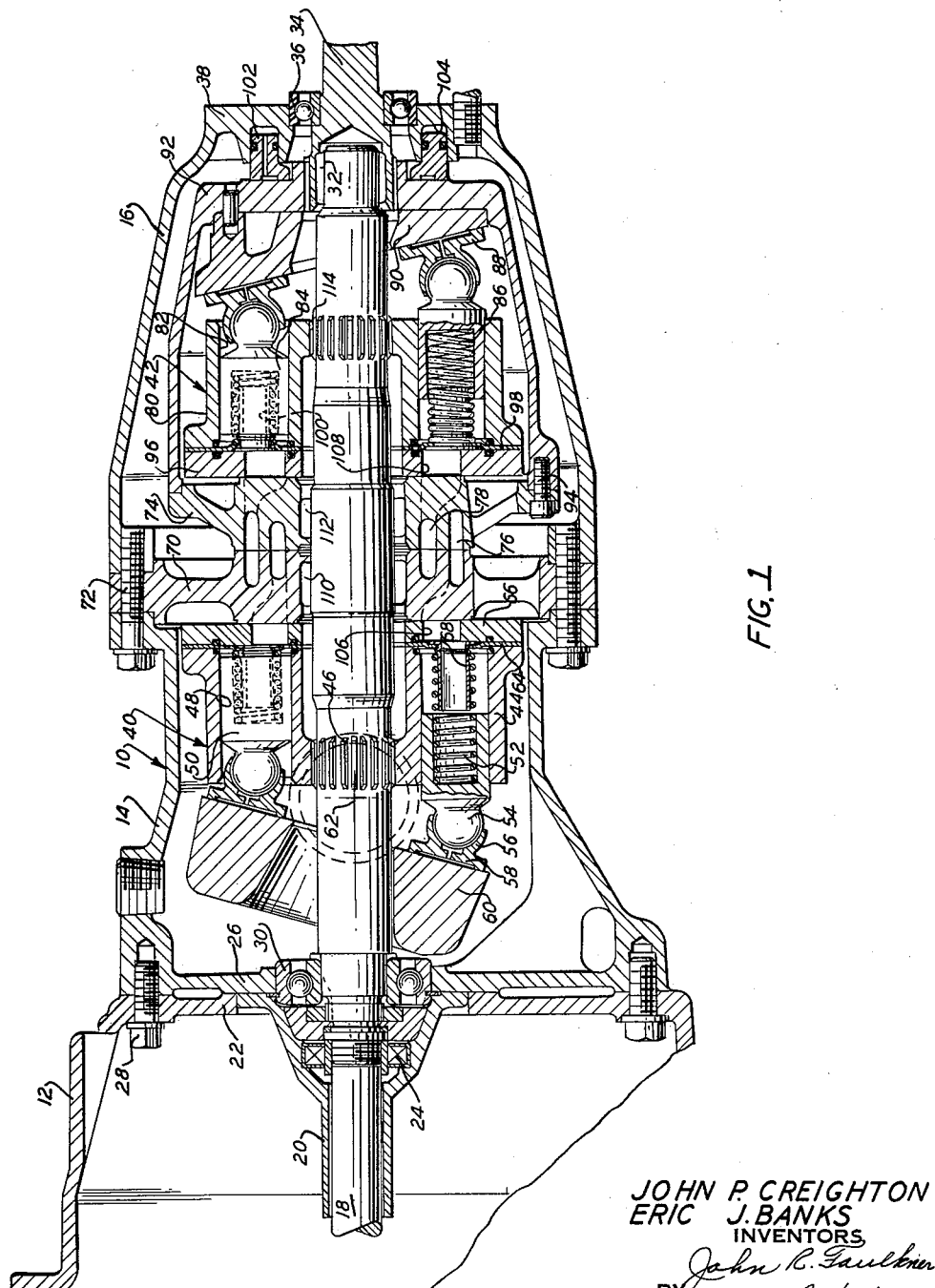
FIGURE 1 is a cross sectional assembly view of my improved mechanism.
Figure 3:
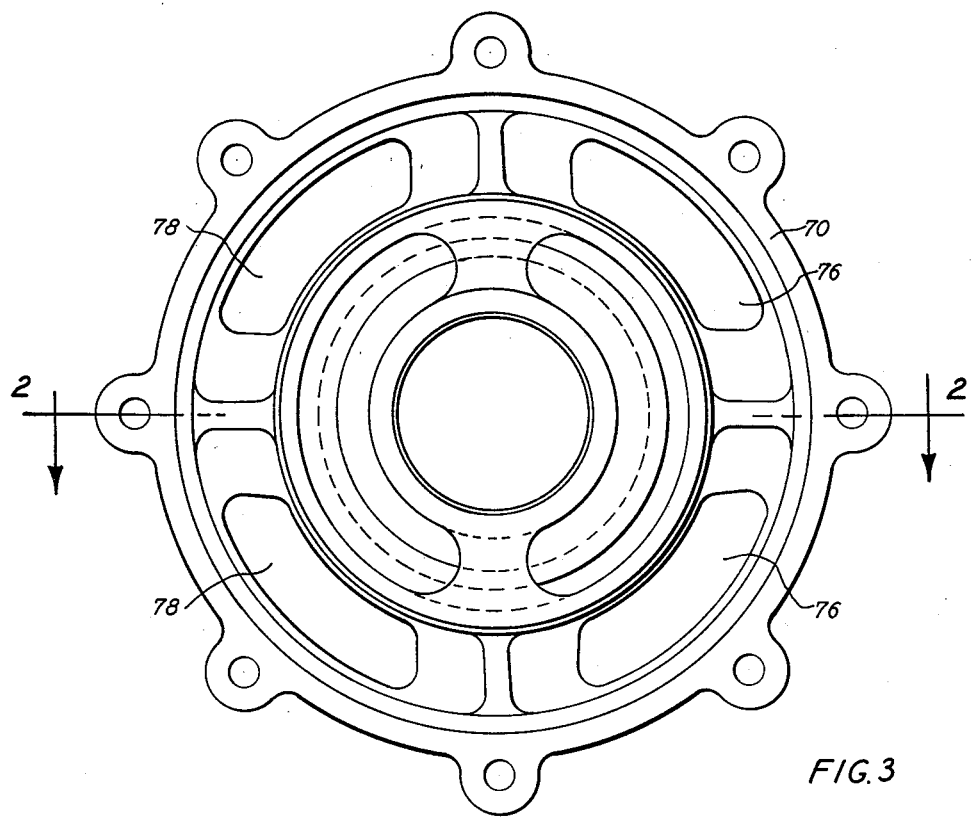
FIGURE 3 is a plan view of the structure of FIGURE 2.
Figure 2:
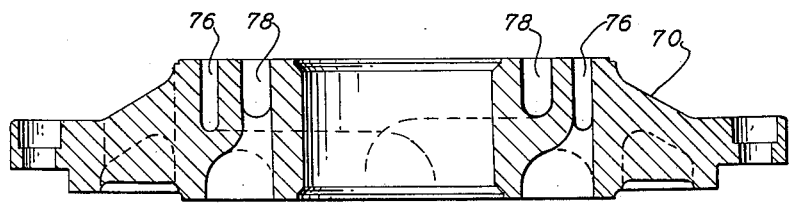
FIGURE 2 is a cross sectional view of one of the face valves of my improved mechanism and is taken along section line 2—2 of FIGURE 3.

Referring first to FIGURE 1, the transmission housing is identified generally by reference character 10. It includes a clutch housing portion 12, an intermediate housing portion 14 and an end housing portion 16. Housing portion 12 is adapted to enclose the friction clutch structure for connecting a prime mover, not shown, to a power input shaft 18. A stationary sleeve shaft 20 may be used for supporting the rotary portion of the clutch structure. This in turn is connected to a transverse wall 22 for the housing portion 12. A fluid seal 24 is situated between the shaft 18 and the wall 22.

A wall 26 forms a part of housing portion 14 and is bolted in end-to-end relationship to wall 22 by bolts 28. It is formed with a central opening for receiving a bearing 30 that in turn journals shaft 18.

The shaft 18 extends through housing portions 14 and 16 and is journaled by means of a bearing 32 within a suitable bearing recess formed by a power output shaft 34. Shaft 34 in turn is journaled by a bearing 36 within an end opening in a wall 38 that forms a part of the housing portion 16.

A first hydrostatic unit is designated generally by reference character 40 and a second hydrostatic unit is shown generally at 42. Unit 40 includes a rotor 44 that is substantially cylindrical in form. It is formed with a central opening having internal splines to accommodate a splined connection with external splines formed on shaft 18. This splined connection is shown at 46.

A plurality of cylinder chambers 48 is formed in rotor 44, the axis of each opening 48 being parallel to the axis of shaft 18. Pistons 50 are received within the openings 48 and they are biased in a left-hand direction as viewed in FIGURE 1 by springs 52. The end of each of the pistons 50 is formed with a ball 54 received within a cooperating socket 56. These sockets carry shoes 58 that slidably engage a bearing surface on a tiltable swash plate 60. The swash plate can be tilted about a fixed axis 62 and can be held against rotation relative to the housing 10.

A fluid cavity is formed between each shoe and the cooperating sliding surface of the swash plate 60.

An abutment plate 64 is located between the rotor 44 and a cooperating ported plate 66. This plate 64 supports spring guide 68.

A relatively stationary face valve 70 is located adjacent plate 66. It is bolted at its periphery to the juxtaposed peripheries of the housing portions 14 and 16. These housing portions and the face valve 70 are bolted together to form a unitary assembly by means of bolts 72.

A relatively movable face valve is shown at 74 and disposed in sliding engagement with the face valve 72. Each of the face valves is formed with two ports that are identified by reference numerals 76 and 78. The ports 78 for face valve 74 cooperate and register with the ports 78 for the face valve 70. In a similar fashion, ports 76 for each of the face valves cooperate and register with each other.

The hydrostatic unit 42 also includes a rotor that is identified in FIGURE 1 by reference numeral 80. It includes a plurality of cylindrical openings shown at 82 within which movable pistons 84 are mounted. These pistons 84 extend in the direction of the axis of the shaft 18 and are urged in a right-hand direction as viewed in FIGURE 1 by springs 86. A ball and socket connection between each of the pistons 84 and a shoe 88 is provided, the shoes slidably engaging a tilted bearing surface for a swash plate 90, the latter being pinned or otherwise secured to a rotary drum 92. This drum is connected to the rotary face valve 74 by bolts 94.

A ported plate 96 is disposed between rotor 80 and face valve 74. A spring abutment plate 98 is situated between plate 96 and the rotor 80 and supports spring guides 100 for the spring 86.

The drum 92 carries an annular piston 102 that is received within a cooperating annular cylinder 104 formed in the plate 38 for the housing portion 16. The working chamber defined by the piston 102 and the cylinder 104 can be pressurized to cause the face valve 74 to be urged into mating relationship with respect to the face valve 70.

Each of the ported plates 66 and 96 is formed with a pair of fluid pressure distributor ports that establish communication between the associated cylindrical openings in the rotor and the ports 76 and 78. The ports for ported plate 66 are identified by reference numeral 106 and the corresponding ports for the plate 96 are shown at 108.

Auxiliary bearings 110 and 112 can be situated between the shaft 18 and the face valves. A splined connection between the shaft 18 and the rotor 80 is shown at 114.

A connection between the shaft 18 and the rotor for hydrostatic unit 40 and the corresponding connection for the hydrostatic unit 42 are defined by splines that are crowned thus allowing a limited degree of tilting motion of the rotors with respect to the shaft 18.

The ported plate for rotor 80 is urged normally into engagement with face valve 74 by reason of an unbalanced pressure force acting thereon. The effective area on the right-hand side of this plate that is subjected to high pressure is greater than the corresponding area on the left-hand side of the plate. The same is true with respect to the ported plate for rotor 44. Unbalanced pressure forces act also on this plate to urge the same into engagement with its associated face valve.

To replace any oil that may be lost through leakage from the hydraulic circuit, an engine driven boost pump can be provided. The boost pressure supplied by this pump can be fed through suitable ports, not illustrated, in a stationary face valve and through a passage communicating with the ports 78 and 76.

During operation, power is delivered to shaft 18 thus driving rotors 44 and 80. If the swash plate 60 is in the vertical position, the associated pistons in the rotor 44 will not reciprocate relative to the rotor 44. Consequently, the pistons and the rotor 80 will not reciprocate and the swash plate 90 will rotate in unison with the rotor 80. A direct drive condition thus is established between power input shaft 18 and the power output shaft.

If the swash plate 60 is tilted toward the position shown in FIGURE 1, pressurized oil passes between the rotors thus causing the swash plate to rotate in a reverse direction relative to the rotor 44. This produces an underdrive. As the angle of tilt of the swash plate 60 is increased still further, the degree of underdrive increases until the rotation of the power output shaft is stopped. Further inclination of the swash plate 60 will result in a reverse drive of the power output shaft.

If the swash plate 60 is tilted in the opposite direction from the vertical direct drive position, the swash plate 90 will be caused to overspeed the shaft 18, thus causing an overdrive condition. The degree of overdrive will be increased as the angularity of the swash plate 60 in a reverse direction is increased still further.

If rotors contain an equal number of cylinders of equal bore, the power output shaft will be held stationary when the inclination of the swash plate 60 is equal to the inclination of the swash plate 90—assuming, of course, that the swash plates are in proper phase.

During operation in direct drive, all of the torque is delivered mechanically as previously explained. This is due to the fact that the hydraulic hydrostatic units are inoperative. This results in a higher over-all operating efficiency during direct drive.

We contemplate that the cylinders in the rotors can be formed of different bores to give an increased or decreased effect for a given change in inclination of the swash plates. Also, the swash plate 90 need not be fixed although this is simpler both from the point of view of construction and operation.

We contemplate also that the direct drive connection between the shaft 18 and each of the hydraulic units can be accomplished by connecting shaft 18 to the respective swash plates rather than the rotors. The swash plates then would be the driven members and the rotors would be stationary.

Having thus described a preferred form of our invention, what we claim and desire to secure by United States Letters Patent is:

1. An infinitely variable power transmission mechanism comprising a driving shaft, a driven shaft, a pair of hydrostatic units disposed in a closed hydraulic circuit, each unit having a rotor, fluid displacement elements carried by said rotor, means for controlling the displacement of the elements of each unit, the rotor of each unit being connected to said power input shaft, the displacement controlling means of one unit being held from rotating about the axis of said one unit and the displacement controlling means of the other unit being connected to said power output shaft.

2. An infinitely variable power transmission mechanism comprising a driving shaft, a driven shaft, a pair of hydrostatic units disposed in a closed hydraulic circuit, each unit having a rotor, fluid displacement elements carried by each rotor, means for controlling the displacement of the elements of each unit, the displacement controlling means of one hydraulic unit being held from rotating about the axis of said one unit and the displacement controlling means of the other unit being connected to said power output shaft, a stationary face valve disposed in sliding engagement with the rotor of said one unit, and a rotary face valve engageable with said stationary face valve, said rotary face valve being connected to the displacement controlling means for said other unit, said rotor for said other unit being disposed in sliding engagement with said rotary face valve, said face valves controlling cross flow between said units whereby a torque delivery path is established hydraulically from said power input shaft to said power output shaft.

3. An infinitely variable power transmission mechanism comprising a driving shaft, a driven shaft, a pair of hydrostatic units disposed in a closed hydraulic circuit, each unit having a rotor, fluid displacement elements carried by each rotor, means for controlling the displacement of the elements of each unit, the displacement controlling means of one unit being held from rotating about the axis of said one unit and the displacement controlling means of the other unit being connected to said power output shaft, a stationary face value disposed in sliding engagement with the rotor of said one unit, a rotary face valve engageable with said stationary face valve, said rotary face valve behing connected to the displacement controling means for said other unit, said rotor for said other unit being disposed in sliding engagement with said rotary face valve, said face valves controlling cross flow between said units whereby a torque delivery path is established hydraulically from said power input shaft to said power output shaft, and means for hydraulically loading said rotary face valve to urge the valves into sliding engagement with respect to each other.

4. An infinitely variable power transmission mechanism comprising a driving shaft, a driven shaft, a pair of hydrostatic units disposed in a closed hydraulic circuit, each unit having a rotor, fluid displacement elements carried by each rotor, means for controlling the displacement of the elements of each hydrostatic unit, the displacement controlling means of one hydrostatic unit being held from rotating about the axis of said one unit and the displacement controlling means of the other hydrostatic unit being connected to said power output shaft, a stationary face valve disposed in sliding engagement with the rotor of said one unit, and a rotary face valve engageable with said stationary face valve, said rotary face valve being connected to the displacement controlling means for said other unit, said rotor for said other unit being disposed in sliding engagement with said rotary face valve, said face valves controlling cross flow between said units whereby a torque delivery path is established hydraulically from said power input shaft to said power output shaft, the connection between said rotors and said power input shaft comprising cooperating spline teeth formed on said shaft and on said respective rotors, said spline teeth being formed to permit a slight degree of articulation between said rotors relative to said power input shaft.

5. An infinitely variable power transmission comprising a housing, a power input shaft, a power output shaft, a pair of hydrostatic units in said housing, each unit comprising a rotor drivably connected to said power input shaft, a plurality of fluid displacement elements carried by each rotor, means for controlling the displacement of said fluid displacement elements for each unit, a stationary face valve secured to said housing, said rotor for said one hydrostatic unit slidably engaging one surface of said stationary face valve, a rotary face valve slidably engageable with the other surface of said stationary face valve, the rotor for said other hydrostatic unit slidably engaging the other surface of said rotary face valve, said face valves being ported to permit cross flow between said hydrostatic units whereby a torque delivery path is established hydraulically from said power input shaft to said power output shaft, the displacement controlling means for said other hydrostatic unit being connected to said power output shaft and the displacement controlling means for said one hydrostatic unit being angularly adjustable and non-rotatably mounted on said housing, and means for hydraulically loading said rotary face valve to establish a biasing force therein and tending to urge said face valves into sliding engagement.

6. An infinitely variable power transmission mechanism comprising a housing, a power input shaft, a power output shaft, a pair of hydrostatic units in said housing comprising a rotor, a plurality of fluid displacements elements carried by each of said rotors, each rotor being formed with cylinders to accommodate said displacement elements, a ported plate carried by each rotor, each plate having spaced ports that establish communication with the cylinders of said rotor, means for controlling the displacement of the elements of each unit, the displacement controlling means for one unit being pivoted on said housing and the displacement controlling means for the other unit being mechanically connected to said power output shaft, a stationary face valve carried by said housing, a ported plate for said one unit slidably engaging one surface of said face valve, a rotary face valve having a surface slidably engageable with the other surface of said stationary face valve, a ported plate for said other unit slidably engaging the other surface of said rotary face valve, said face valves being ported to accommodate cross flow between said units whereby a hydraulic torque delivery path is established between said power input shaft and said power output shaft, the effective fluid pressure area on each side of said plates being unbalanced thereby establishing a sealing action between each plate and its respective face valve.

References Cited in the file of this patent
UNITED STATES PATENTS
2,569,562    Froebe _____ Oct. 2, 1951